United States Patent [19]
Harada

[11] Patent Number: 5,553,451
[45] Date of Patent: Sep. 10, 1996

[54] ELECTRICALLY HEATED CATALYTIC CONVERTER SYSTEM FOR AN ENGINE

[75] Inventor: Kenichi Harada, Susono, Japan

[73] Assignee: Toyota Jidosha Kabushiki Kaisha, Toyota, Japan

[21] Appl. No.: 441,854

[22] Filed: May 16, 1995

[30] Foreign Application Priority Data

May 30, 1994 [JP] Japan .................................. 6-116679

[51] Int. Cl.$^6$ ........................................................ F01N 3/10
[52] U.S. Cl. ............................ 60/277; 60/284; 60/300
[58] Field of Search ........................... 60/277, 300, 303, 60/284

[56] References Cited

U.S. PATENT DOCUMENTS

| | | | |
|---|---|---|---|
| 3,820,326 | 6/1974 | Inoue et al. | 60/277 |
| 4,007,589 | 2/1977 | Neidhard et al. | 60/277 |
| 5,211,010 | 5/1993 | Hirota | 60/284 |
| 5,224,335 | 7/1993 | Yoshizaki | 60/300 |
| 5,265,418 | 11/1993 | Smith | 60/284 |

FOREIGN PATENT DOCUMENTS 47-22313  11/1972  Japan .

Primary Examiner—Leonard E. Heyman
Attorney, Agent, or Firm—Kenyon & Kenyon

[57] ABSTRACT

In the electrically heated catalytic converter system according to the present invention, the catalytic converter is provided with an electric heater. The electric heater is turned on by a switching device for a predetermined time period after the engine starts in order to heat the catalytic converter. When the switching device fails in such a manner that the switching device cannot turn off the electric heater even after the predetermined time period lapsed, the catalytic converter is heated by the electric heater even after the catalyst reaches the activating temperature. This may cause an excessive temperature rise and damage to the catalytic converter. The electronic control unit of the engine monitors the electric current supplied to the electric heater, and if the electric current is supplied to the electric heater continuously after the predetermined time period lapsed, the electronic control unit lowers the setting of the maximum limit of the speed of the engine to a value determined by the degree of opening of the throttle valve. Therefore, the engine is operated at a relatively low speed when the switching device has failed and the amount of the exhaust gas flowing through the catalytic converter is reduced. Thus the amount of the heat transferred from the exhaust gas to the catalytic converter is reduced, and an excessive temperature rise of the catalytic converter is suppressed.

8 Claims, 16 Drawing Sheets

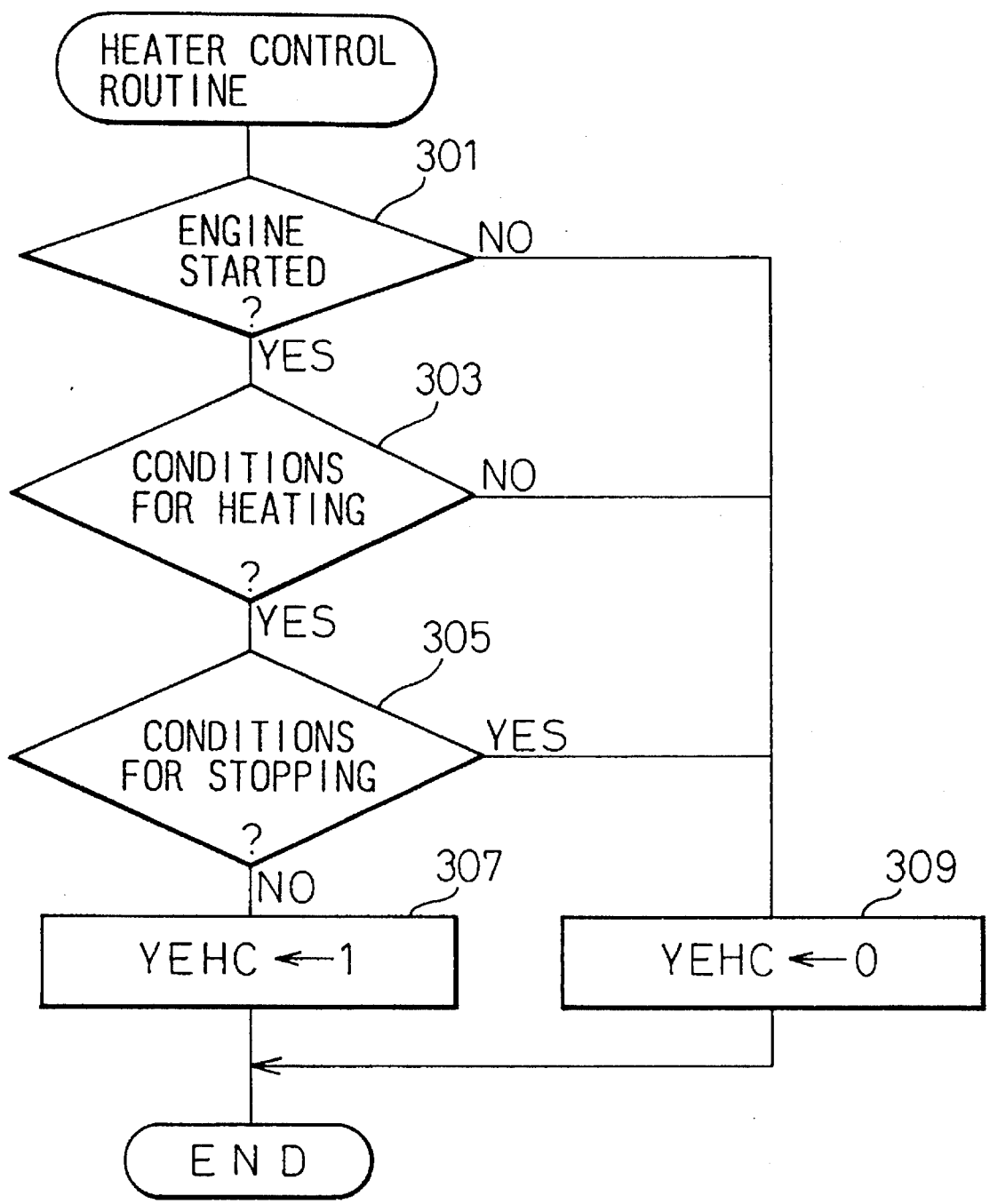

ELECTRICALLY HEATED CATALYTIC CONVERTER SYSTEM FOR AN ENGINE

BACKGROUND OF THE INVENTION

1. Field of the Invention

The present invention relates to an electrically heated catalytic converter system for an engine that has a catalytic converter equipped with an electric heater.

2. Description of the Related Art

An exhaust gas purification device that utilizes a three-way reducing and oxidizing catalytic converter disposed on the exhaust passage of the internal combustion engine is commonly used. Generally, the catalyst used in such converters is able to purify pollutants in the exhaust gas only when the temperature of the catalyst becomes higher than a certain temperature, i.e., the catalysts in the converter do not work when the temperature is lower than the activating temperature of the catalyst.

Usually, the catalyst in the converter is gradually heated by the exhaust gas and reaches the activating temperature after the engine starts. However, when the temperature of the engine is low, for example, after a cold start of the engine, it takes a long time to heat the catalyst to the activating temperature since the heat of the exhaust gas is removed by the cold wall of the exhaust passage before it reaches the converter. Therefore, in a cold start of the engine, the exhaust gas of the engine is not sufficiently purified since the temperature of the catalyst is lower than the activating temperature.

To solve this problem, Japanese Unexamined Utility Model Publication (KOKAI) No. 47-22313 discloses a catalytic converter equipped with an electric heater for heating the catalyst after the engine starts. In this device, the electric heater is turned on for a predetermined time period, after the engine starts, to heat the catalyst so that the temperature of the catalyst reaches the activating temperature in a short time. When the predetermined time lapsed after the engine starts, the electric heater is turned off. However, the temperature of the catalyst reaches the activating temperature before the electric heater is turned off, and an oxidizing reaction starts in the catalytic converter. Also, the exhaust gas temperature increases when the predetermined time has lapsed. Therefore, the catalyst is maintained at high temperature by the heat given by the exhaust gas as well as by the heat generated by the oxidation of the HC and CO components in the exhaust gas by the catalyst.

However, in order to heat the catalytic converter in a short time to the activating temperature, it is required to supply a large electric current to the electric heater. In some cases, this causes the contacts of the switching device to be welded together due to the heat generated by the large electric current. When such a failure of the switching device occurs, the electric heater cannot be turned off after the predetermined time has lapsed. In this case, the electric current continues to flow through the electric heater even after the oxidation of HC and CO components starts in the catalytic converter, and the catalytic converter receives heat from the electric heater in addition to the heat from the exhaust gas and the heat generated by the oxidation of HC and CO components in the exhaust gas. If engine operation is continued in such conditions, the temperature of the catalytic converter becomes excessively high, and a deterioration of the catalyst or a damage of the substrate of the catalyst may occur due to the excessive temperature. Therefore, it is necessary to stop the engine when such failure of the switching device occurs.

However, in case of the automotive engines, it is preferable to continue the engine operation even in such failures in order to bring the vehicle to the service garage for repair.

It may be possible to continue the engine operation even when such failure occurs if an additional emergency switch for disconnecting the electric heater is provided to the heater circuit. However, even if such an emergency switch is provided, the damage of the catalytic converter is still possible if the contacts of the emergency switch are welded. Further, it is not preferable to add another switch to the circuit since it increases the complexity of the system and lowers the reliability of the system.

SUMMARY OF THE INVENTION

In view of the problems set forth above, the object of the present invention is to provide an electrically heated catalytic converter system which allows engine operation in case of failure of the switching device by suppressing an excessive temperature rise of the catalytic converter without using additional switches.

The above object is achieved by an electrically heated catalytic converter system according to the present invention in which the electrically heated catalytic converter system comprises a catalytic converter disposed on the exhaust passage of the engine for removing pollutants in the exhaust gas, an electric heater for heating the catalytic converter, a heater control means for supplying electricity to the electric heater for a predetermined time period after the engine starts, to thereby increase the temperature of the catalytic converter, a failure detecting means for detecting that the heater control means has failed in such a manner that the heater control means continues to supply electricity to the electric heater after the predetermined time period has lapsed, and a temperature rise suppressing means for suppressing excessive temperature rise of the catalytic converter when the failure detecting means detects a failure of the heater control means.

BRIEF DESCRIPTION OF THE DRAWINGS

The present invention will be better understood from the description as set forth hereinafter, with reference to the accompanying drawings, in which:

FIG. 3 is a flowchart showing a routine for controlling the heating operations of the heater-converter;

DESCRIPTION OF THE PREFERRED EMBODIMENTS

Figure 1:
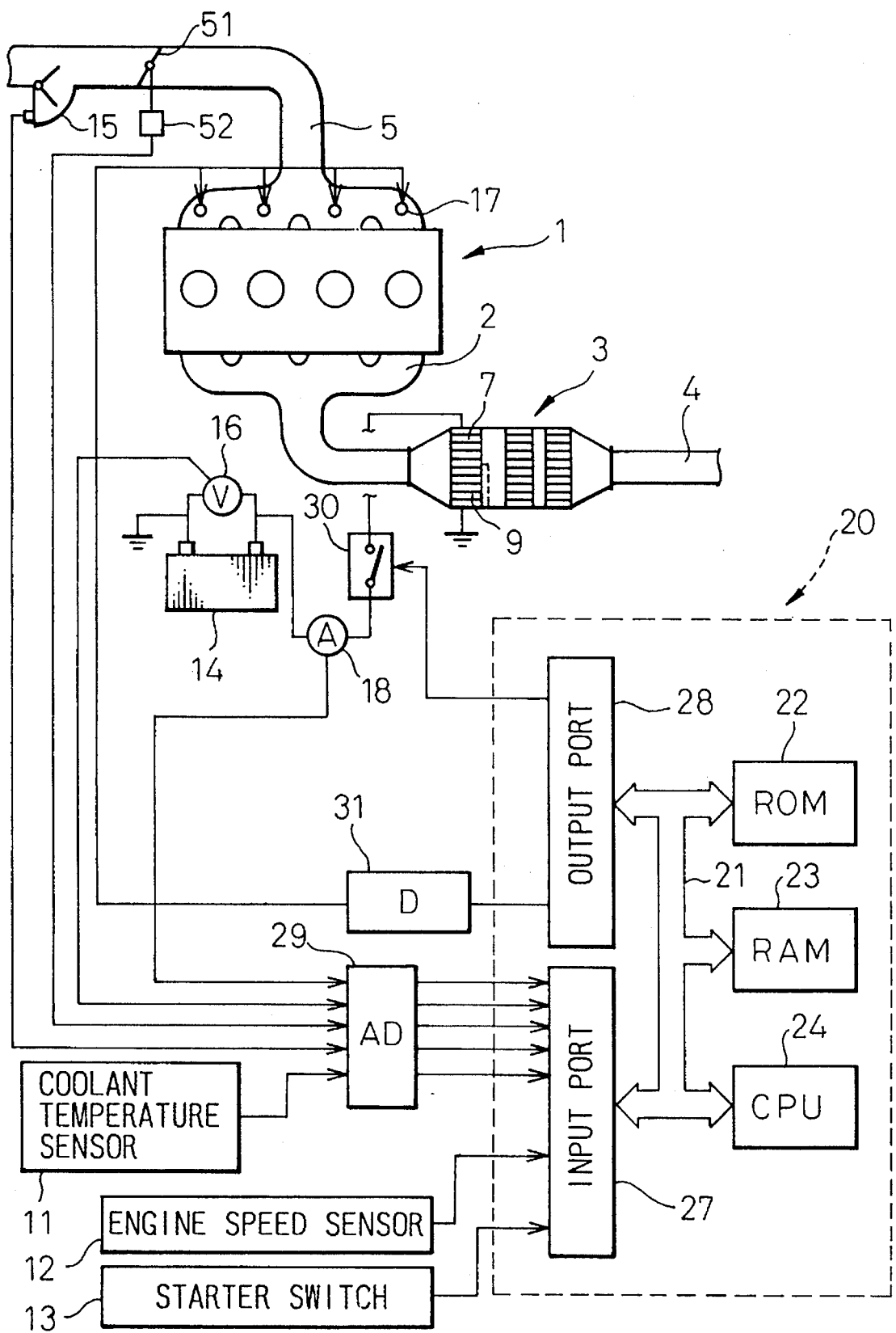
FIG. 1 is a drawing schematically illustrating an automotive engine equipped with an electrically heated catalytic converter system according to an embodiment of the present invention.

FIG. 1 schematically illustrates an embodiment of the present invention in which the electrically heated catalytic converter system is applied to an automotive engine.

In FIG. 1, reference numeral 1 represents an internal combustion engine, numeral 2 is an exhaust manifold of the engine 1. Numeral 4 is an exhaust passage connected to the exhaust manifold. On the exhaust passage 4, a catalytic converter 3 for removing the pollutants in the exhaust gas is disposed.

Figure 2A:
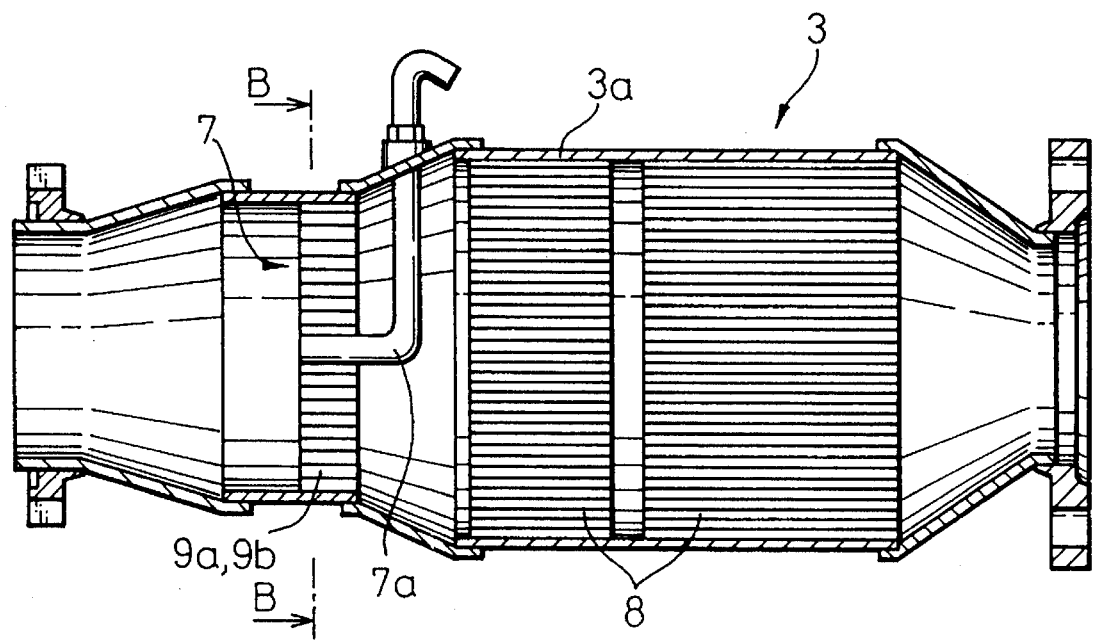
FIGS. 2A and 2B are sectional drawings showing construction of the heater-converter.

FIG. 2A shows the sectional view taken along the axis of catalytic converter 3. As shown in FIG. 2A, the catalytic converter 3 comprises a cylindrical metal casing 3a, a heater-converter 7 disposed in the cylindrical casing 3a, and a main converter 8 disposed in the casing 3a downstream of the heater-converter 7. The heater-converter 7 has a metal substrate 9. In this embodiment, the metal substrate 9 also acts as an electric heater for heating the catalytic converter 3.

Figure 2B:
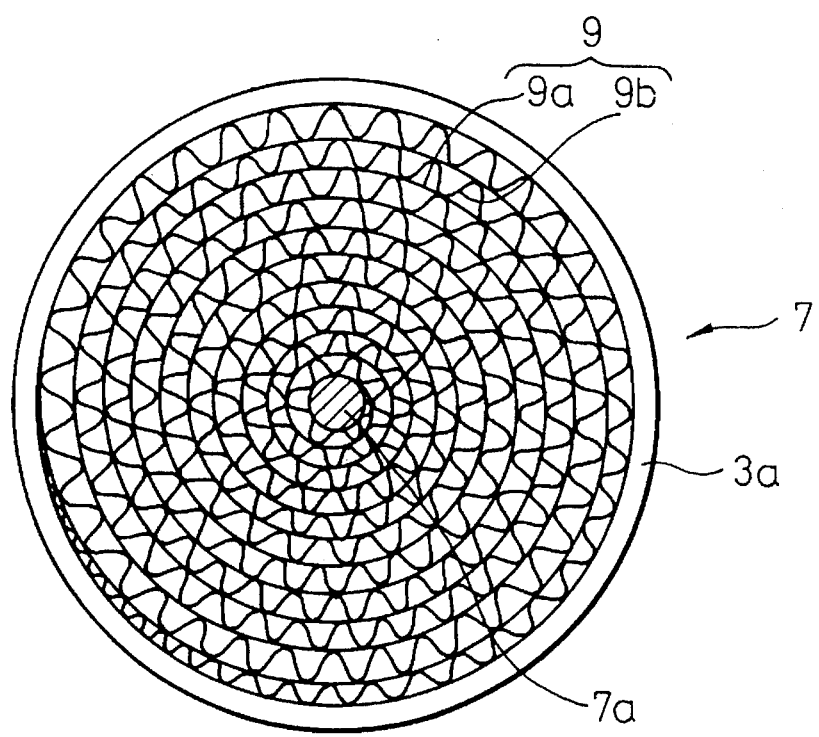

FIG. 2B is a sectional view of the heater-converter 7 taken along the line B—B in FIG. 2A. The substrate 9 of the heater-converter in this embodiment consists of thin metal sheets 9a and 9b. The metal sheet 9a is a plain metal sheet and the metal sheet 9b is a corrugated metal sheet. The substrate 9 is formed as a scroll-like laminated assembly of the metal sheets 9a and 9b. Namely, the plain metal sheet 9a and the corrugated metal sheet 9b are laminated together and wound around a rod-like common center electrode 7a in such a manner that the metal sheets 9a and 9b form a scroll-like cylinder. Particles of three-way reducing and oxidizing catalyst of a known type are attached to the surfaces of the thin metal sheets 9a and 9b. When the engine 1 starts, an electric current is fed to the substrate 9 of the heater-converter 7 through the center electrode 7a. The electric current flows through the metal sheets 9a and 9b from the electrode 7a to the metal casing 3a which acts as an outer electrode. Thus the metal sheets 9a and 9b are heated by the electric current and reach the activating temperature of the catalyst attached thereto a short time after the engine starts. As explained above, the plain metal sheet 9a and the corrugated metal sheets 9b, when combined, act as electric heaters as well as a substrate for the catalyst particles. As explained later, the heating operation of the heater-converter 7 is controlled by an electronic control unit (ECU) 20 for the engine 1.

The main converter 8 is common type catalytic converter having a metal or ceramic honeycomb type substrate and having larger capacity than the heater-converter 7. Since the main converter 8 is disposed downstream of the heater-converter 7 in the casing 3a, when the heater-converter reaches the activating temperature and the catalytic action starts in the heater-converter, the exhaust gas heated by the oxidation of HC and CO components in the heater-converter flows into the main converter 8. Thus the temperatures of the main converter 8 also reaches the activating temperature a short time after the engine starts.

As illustrated in FIG. 1, the center electrode 7a is connected to a battery 14 via a relay 30, and the metal casing 3a is grounded. The relay 30 is set ON and OFF by a signal supplied from an output port 28 of the electronic control unit (ECU) 20.

The electronic control unit 20, which may be constructed by a microcomputer, comprises a central processing unit (CPU) 24, a read-only-memory (ROM) 22, a random-access-memory (RAM) 23 and an input port 27 and an output port 28, all mutually connected by a bus 21. The ECU 20 controls the fuel injection and ignition timing of the engine 1 and, in this embodiment, the ON/OFF operation of the heater-converter 7. Further, as explained later in detail, the ECU 20 detects that the relay 30 has failed in such a manner that the heater-converter 7 cannot be disconnected, and when such failure occurs, controls the operation of the engine 1 to suppress an excessive temperature rise in the catalytic converters 7 and 8.

To perform such controls, various signals are fed to the input port 27 of ECU 20 via an AD converter 29. These signals are, for example, a voltage signal proportional to the amount of intake air from an airflow meter 15 disposed in an intake air passage 5 of the engine and a voltage signal proportional to the temperature of the engine coolant from a coolant temperature sensor 11 disposed on a water jacket of the engine 1.

Further, a signal corresponding to the voltage of the battery 14 and a signal corresponding to the electric current supplied to the heater-converter 7 are fed from a voltage sensor 16 and a current sensor 18, respectively. Also, a pulse signal representing an engine speed from an engine speed sensor 12 disposed on a distributor (not shown) of the engine 1, and an ON/OFF signal of a starter motor (not shown) from the starter switch 13 are fed to the input port 27, respectively. Further, a throttle angle signal which corresponds to the degree of opening of the throttle valve 51 in the intake air passage 5 of the engine is supplied by a throttle angle sensor 52 to the input port 27 via the AD converter.

The output port 28 of the ECU 20 is connected to fuel injection valves 17 of the engine 1 via a drive circuit 31 to control the fuel injection of the engine 1. Further, the output port 28 is connected to the relay 30 to supply the signal to set the relay 30 ON and OFF.

Next, the control of the heater-converter 7 is explained with reference to FIG. 3. FIG. 3 is a flowchart of the control routine of the heater-converter performed by the ECU 20 at predetermined intervals.

In FIG. 3, when the routine starts, it is determined whether the engine has started at step 301. When the engine speed is higher than a predetermined value (such as 400 rpm) and the starter switch is set OFF (i.e., the starter motor is turned off), it is determined that the engine 1 has started (i.e., the starting operation of the engine is completed). If the starting operation of the engine is not completed at step 301, the routine terminates after performing step 309 which sets the value of flag YEHC to 0.

If the starting operation of the engine 1 is completed at step 301, the routine proceeds to step 303 which determines whether the conditions for supplying electricity to the heater-converter 7 is satisfied. These conditions are: (1) the temperature of the engine coolant is lower than a predetermined value, i.e., the engine is started in cold condition and, (2) the battery terminal voltage is higher than a predetermined value (for example, 10 V). If either the conditions (1) and (2) is not satisfied, the routine terminates after setting the value of the flag YEHC to 0 at step 309.

If both of the conditions (1) and (2) are satisfied at step 303, the routine proceeds to step 305 which determines whether the conditions for terminating the electric supply to the heater-converter 7 are satisfied. The conditions for terminating the electric supply to the heater-converter 7 are: (a) an accumulated total value of the amount of the intake air after the engine started is larger than a predetermined value and, (b) a predetermined time (for example, ten seconds) has lapsed since the engine started. If either of the conditions (a) and (b) is satisfied at step 305, the conditions for terminating the electric supply is considered satisfied, and the routine terminates after setting the value of the flag YEHC at 0 at step 309.

If both of the conditions (a) and (b) are not satisfied at step 305, the value of the flag YEHC is set to be 1 at step 307 before the routine terminates.

In this embodiment, the ECU 20 feeds an ON signal to the relay 30 to supply electricity to the heater-converter 7 when the value of the flag YEHC is set to be 1. Upon receiving the ON signal from the ECU 20, the contacts of the relay 30 are closed and electric current is supplied to the heater-converter 7 through the relay 30. On the other hand, when the value of the flag YEHC is set to be 0, the ECU 20 stops feeding the signal to the relay 30, and the contacts of the relay 30 are opened to stop the flow of electric current to the heater-converter 7.

As explained above, the supply of the electricity is started when the starting operation of the engine is completed (step 301) and both the conditions (1) and (2) explained above are satisfied (step 303), and the supply of the electricity is terminated when either of the conditions (a) and (b) explained above is satisfied (step 305).

The reason why the accumulated amount of the intake air is used as the condition for terminating the supply of the electricity is that the amount of the intake air represents the engine load. Since the engine load is directly proportional to the amount of the heat generated by the engine, it is considered that the accumulated value of the amount of the intake air represents the accumulated amount of the heat transferred from the engine to the catalytic converter. Therefore, it is assumed that the catalytic converter has been warmed up by the exhaust gas when the accumulated amount of the intake air becomes larger than a certain value. In this case, it is no longer necessary to supply electricity to the heater-converter 7 to heat the catalytic converter 3.

By performing the routine in FIG. 3, electricity is supplied to the heater-converter 7 when the temperature of the catalyst particles is low after the engine is started in the cold condition and the catalyst particles on the substrate 9 are heated up a short time after the engine starts. Further, since the supply of the electricity to the heater-converter 7 is terminated when it is considered that the catalytic converter is heated sufficiently, an excessive temperature rise in the catalytic converter is prevented from occurring.

However, if the contacts of the relay 30 are welded together, the supply of the electricity to the heater-converter cannot be terminated even when the ECU 20 feeds an OFF signal to the relay 30. When the operation of the engine is continued in such a condition, the temperature of the catalytic converter 3 becomes excessively high, and deterioration of the catalyst or damage of the substrate, such as cracking or melting, may occur.

Figure 4:
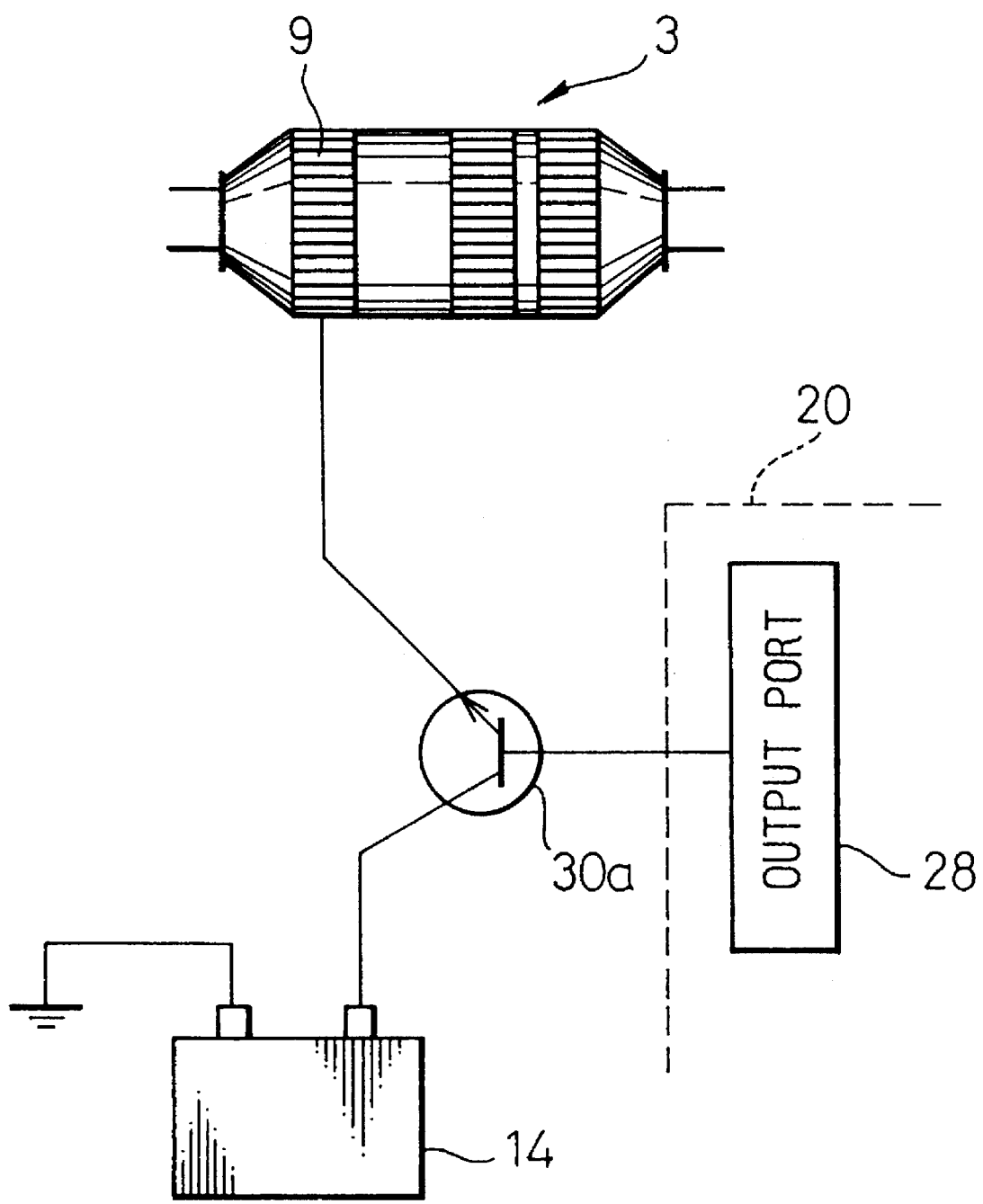
FIG. 4 is a drawing showing an example of the switch used for the electrically heated catalytic converter system.

To eliminate the possibility of the welding of the contact, a transistor relay 30a as shown in FIG. 4, instead of the mechanical relay 30 in FIG. 3, may be used. However even in the case of the transistor relay 30a, a failure which makes it impossible to cut off the electric current may occur in some cases.

Therefore, it is difficult to eliminate the possibility of a failure in the electrically heated catalytic converter system in which termination of the electric supply to the electric heater becomes impossible, and once such a failure occurs, the operation of the engine must be stopped to prevent damage to the catalytic converter.

According to the embodiments explained below, the operation of the engine may continue even when a failure of the electrically heated catalytic converter system occurs, by preventing an excessive temperature rise in the catalytic converter by using the method explained below.

As explained before, there are three sources of the heat which causes an excessive temperature rise in the catalytic converter, when a failure of the electrically heated catalytic converter system occurs. These heat sources are; (1) the heat transferred to the catalytic converter from the exhaust gas, (2) the heat generated by the oxidation of the HC and CO components in the exhaust gas and, (3) the heat generated by the electric current flowing through the heater-converter 7. Therefore, if the total amount of the heat of the sources (1) and (2) is decreased by the amount of the heat of the source (3), an excessive temperature rise in the catalytic converter cannot occur.

In the embodiments explained below, the ECU 20 first determines whether a failure of the electrically heated catalytic converter system which makes the termination of the supply of the electric current impossible has occurred, and if such a failure has occurred, the ECU 20 performs an operation to reduce the heat of the sources (1) and/or (2) to prevent an excessive temperature rise in the catalytic converter while the operation of the engine continues.

Figure 5:
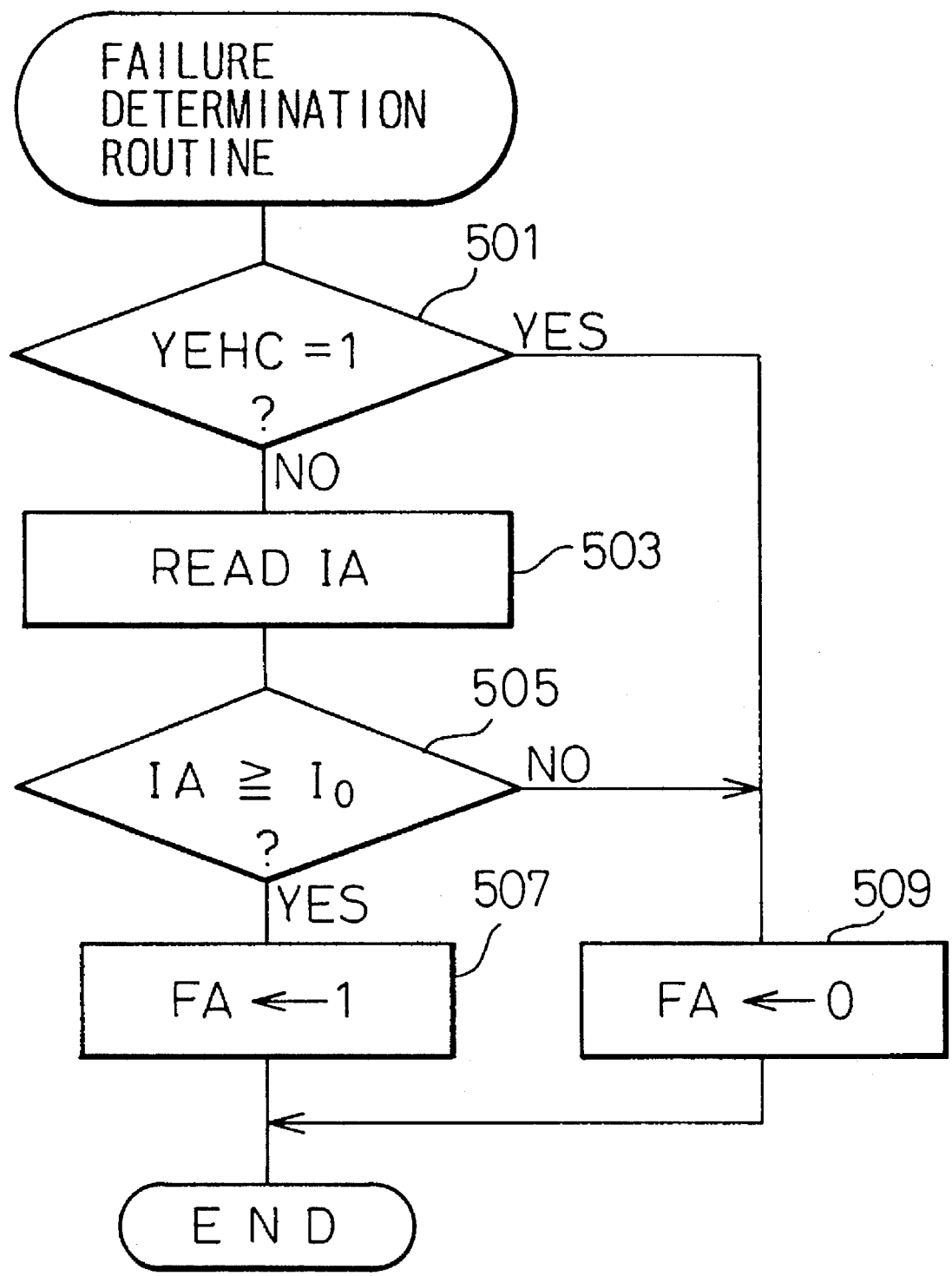
FIG. 5 is a flowchart showing an example of a routine for detecting a failure of the electrically heated catalytic converter system.

FIG. 5 shows a flowchart of the routine for determining whether a failure of the electrically heated catalytic converter system, which makes termination of the supply of electric current impossible, has occurred. This routine is performed by the ECU 20 at predetermined intervals.

When the routine in FIG. 5 starts, at step 501, it is determined whether the value of the flag YEHC (FIG. 3) is set to be 1. If the value of the YEHC is not 1 at step 501, i.e., if the ECU 20 is generating the signal to turn off the heater-converter 7 to the relay 30, the value IA of the electric current is read from the electric current sensor 18 (FIG. 1). At step 505, it is determined whether the value of the electric current IA is larger than a predetermined value $I_0$. If $IA \geq I_0$, at step 505, this means that the electric current is still being supplied to the heater-converter 7, even though the value of the flag is set to be 0, thus it can be assumed that the relay 30 has failed. In this case, the routine proceeds to step 507 in order to set the value of an abnormal condition flag FA to be 1. When the value of the abnormal condition flag FA is set to be 1, the operation for suppressing the excessive temperature rise is performed by the routine explained later. The value $I_o$ is set to sufficiently large value, so that it can be clearly determined that the relay 30 has failed.

If the YEHC=1 at step 501, or IA<$I_0$ at step 505, the value of the abnormal condition flag FA is set to be 0 at step 509. In this case, the operation for suppressing the excessive temperature rise of the catalytic converter 3 is not performed.

Next, the operation for suppressing the excessive temperature rise (hereinafter called a suppression control) which is carried out by the ECU 20 when the value of the flag FA is set at 1 in FIG. 5 is explained.

Figure 6:
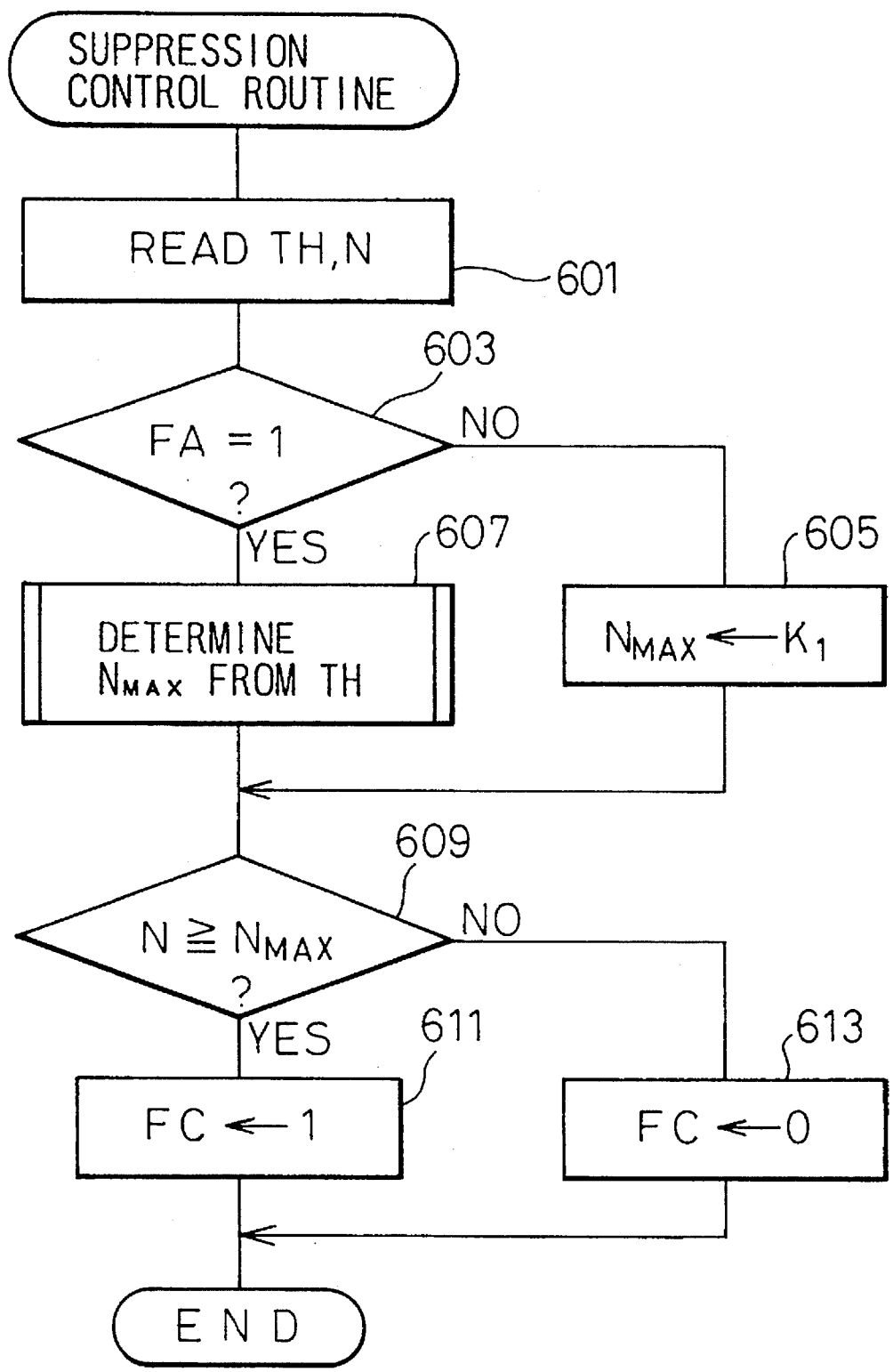
FIG. 6 is a flowchart showing a routine for suppressing an excessive temperature rise in the heater-converter.

FIG. 6 shows a flowchart of an embodiment of the suppression control. As explained hereinafter, when the value of abnormal condition flag FA is set at 1, the ECU 20 lowers the setting for the upper limit of the engine speed in accordance with the degree of opening of the throttle valve 51. By lowering the engine speed, both the exhaust gas temperature and the rate of flow of the exhaust gas are reduced. Thus the amount of the heat transferred from the exhaust gas to the catalytic converter is reduced.

In FIG. 6, at step 601, the values of the degree of opening TH of the throttle valve and the engine speed N are read from the throttle angle sensor 52 and the engine speed sensor 12, respectively. At step 603, it is determined whether the value of the flag FA is 1. If the value of FA is 1 at step 603, then at step 607, the upper limit $N_{MAX}$ for the engine speed is determined from the degree of opening TH of the throttle valve, based on FIG. 7, as explained later. On the other hand, if the value of the flag FA is set at 0, the upper limit $N_{MAX}$ of the engine speed is set to predetermined constant value K.

After determining the value $N_{MAX}$ at steps 605 or 607, the routine proceeds to step 609 which compares the engine speed N and the upper limit $N_{MAX}$. If $N_{MAX \geq N}$ at step 609, a fuel-cut flag FC is set to 1 at step 611, and if $N_{MAX<N}$ at step 609, the fuel-cut flag FC is set to 0 at step 613. In this embodiment, when the value of the fuel-cut flag FC is set at 0, the fuel supply to the engine from the fuel injection valve 17 is cut off by another routine (not shown) performed by the ECU 20. Therefore, the engine speed is always kept lower than the $N_{MAX}$ set at steps 605 and 607.

According to the present embodiment, the upper limit $N_{MAX}$, or the engine speed, is set to a predetermined constant value $K_1$ (at step 605) in normal conditions (i.e., when the electrically heated catalytic converter system has not failed). The constant $K_1$ is determined from the view point of protection of the engine, and the value is set sufficiently high (for example, 8000 rpm). However, in the abnormal condition (i.e., when a failure of the electrically heated catalytic converter system occurs), the value of $N_{MAX}$ is determined based on the degree of opening TH of the throttle valve and in a range lower than the value $K_1$.

Figure 7:
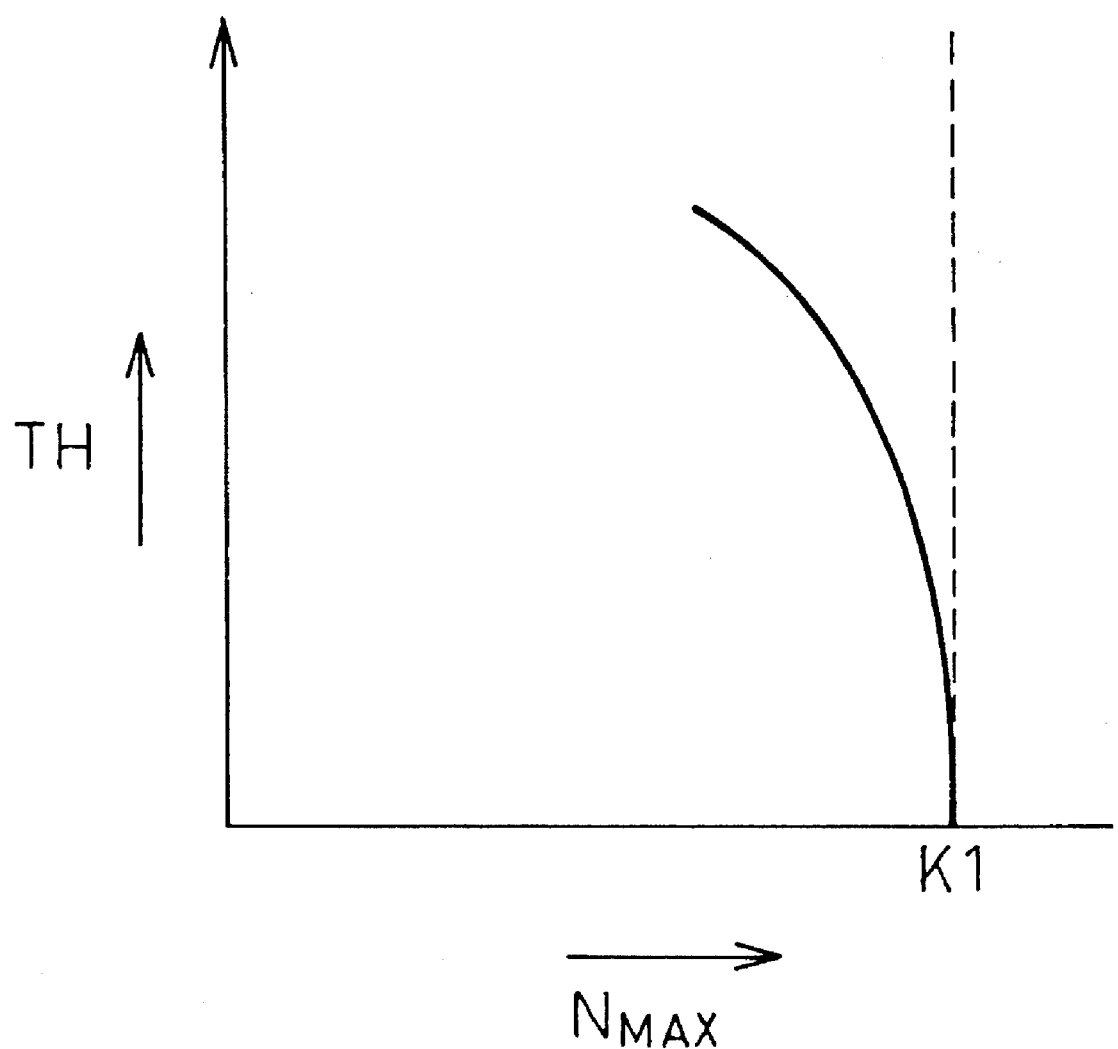
FIG. 7 shows a map used in the routine in FIG. 6.

FIG. 7 shows a typical relationship between $N_{MAX}$ and TH used for determining the value of $N_{MAX}$ at step 607. As shown in FIG. 7, the upper limit $N_{MAX}$ of the engine speed becomes lower as the degree of opening THE of the throttle valve becomes larger. Namely, when a failure of the electrically heated catalytic converter system occurs, the operating speed of the engine becomes lower as the engine load (i.e., the degree of opening of the throttle valve) increases. Since the exhaust gas temperature becomes higher as the engine load increases, the amount of the heat transferred to the catalytic converter per unit time also increases. Therefore, it is necessary to reduce the exhaust gas flow by a larger amount as the engine load increases.

According to the present embodiment, when a failure of the electrically heated catalytic converter system, in which the termination of the electric supply to the heater for the catalytic converter becomes impossible, occurs, the engine speed is controlled in such a manner that the amount of the exhaust gas flow decreases as the engine load increases. Therefore, the amount of the heat transferred to the catalytic converter per unit time is kept low regardless of the engine load, thus an excessive temperature rise in the catalytic converter can be suppressed.

Next, another embodiment of the suppression control is explained with reference to FIG. 8. This embodiment is applied to the engine equipped with a throttle device which is capable of controlling the amount of the intake air regardless of the operation of an accelerator pedal by an operator. This throttle device may consist of, for example, a subthrottle valve provided in addition to the throttle valve 51 in FIG. 1 such as in a traction control system (slip control system) for an automobile.

Though in the embodiment in FIG. 6 the amount of the flow of exhaust gas is reduced indirectly by lowering the engine speed when the abnormal condition occurs, the amount of the flow of the exhaust gas is directly reduced by controlling the subthrottle valve in accordance with the engine speed in this embodiment.

Figure 8:
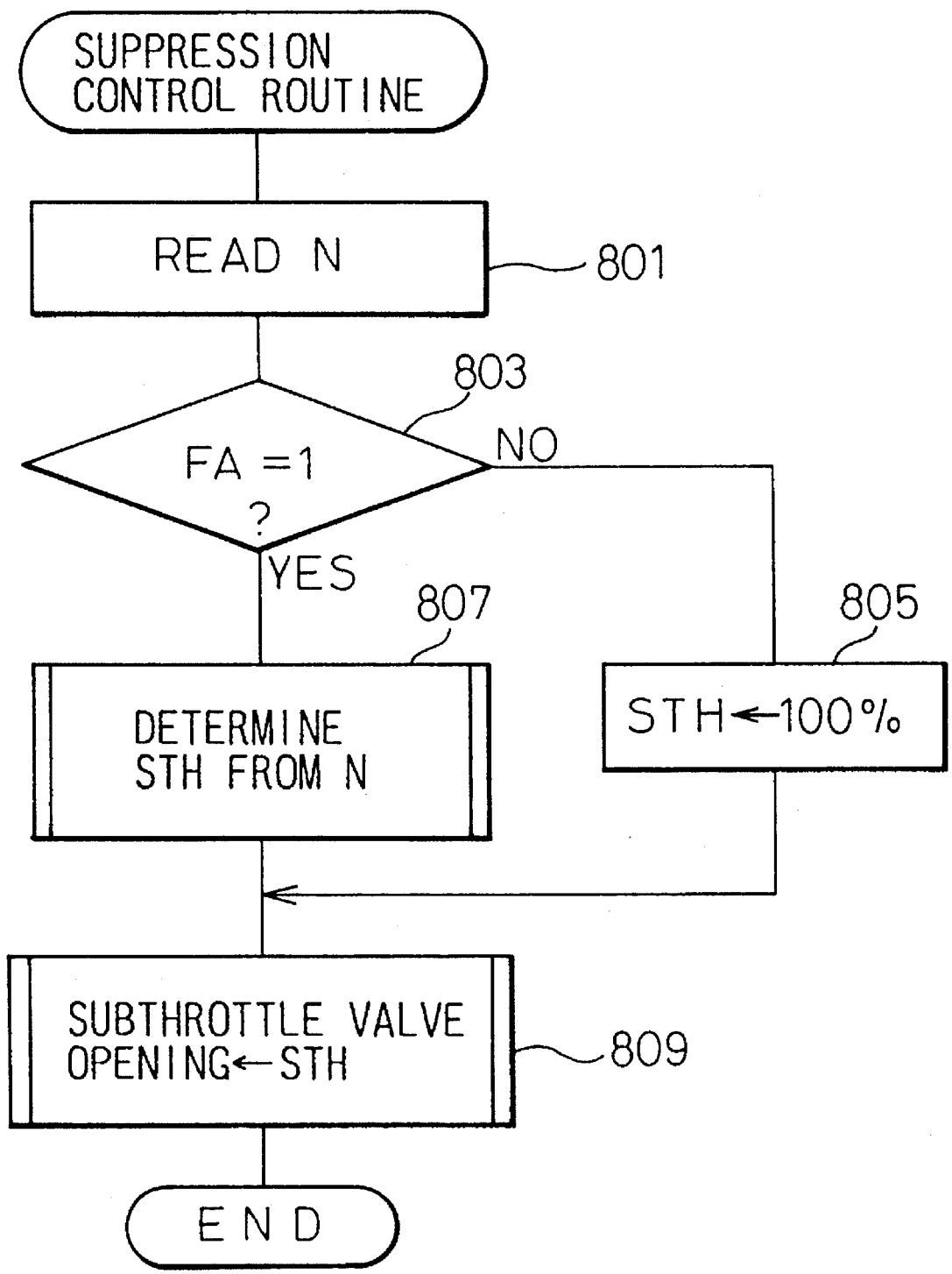
FIG. 8 is a flowchart showing another example of the routine for suppressing an excessive temperature rise in the heater-converter.
Figure 9:
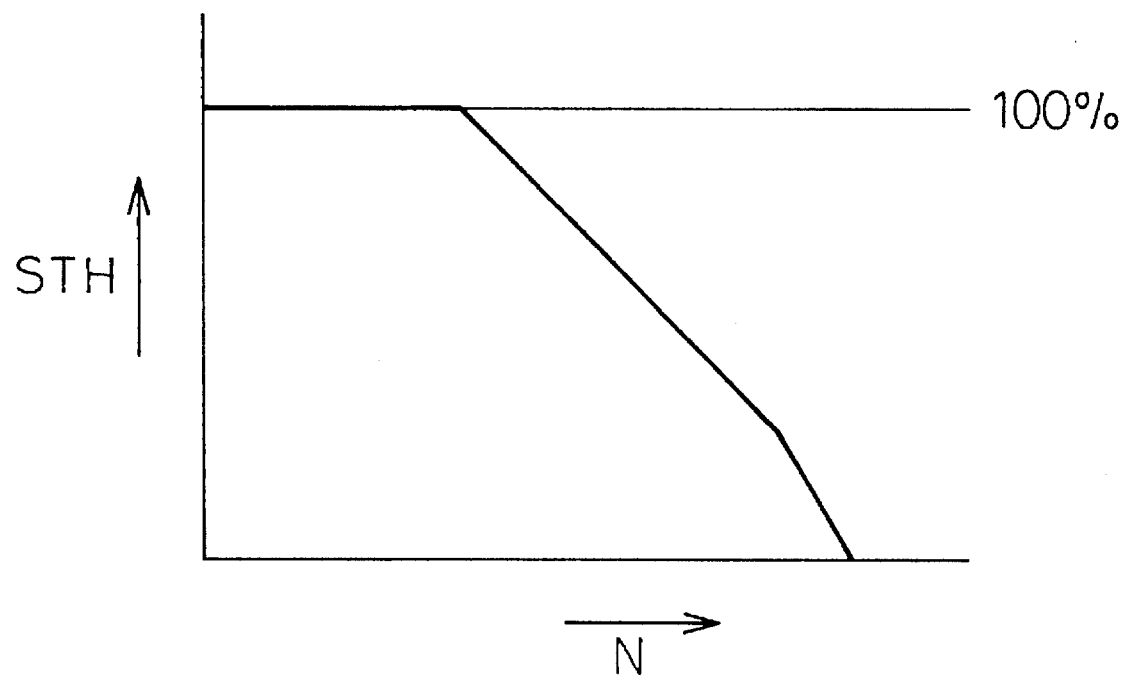
FIG. 9 shows a map used in the routine in FIG. 8.

In FIG. 8, the engine speed N is read from the engine speed sensor 12 at step 801, and if the value of the abnormal condition flag FA is equal to 1 at step 803, the degree of opening STH of the subthrottle valve is determined at step 807 in accordance with a map shown in FIG. 9. If FA≠1 at step 803, the subthrottle valve is set at fully opened position (STH=100%) at step 805. FIG. 9 shows an example of the map used for determining the value of STH at step 807. As shown in FIG. 8, the value of STH is set smaller as the engine speed N increases. Usually, the engine load, as well as the amount of the exhaust gas flow increases as the engine speed N increases, thus the amount of the heat transferred to the catalytic converter per unit time also increases as the engine speed N increases. Therefore, in this embodiment, the degree of opening STH of the subthrottle valve is set smaller as the engine speed N increases in order to lower the engine speed by throttling the intake air. Therefore, the engine load and the amount of the exhaust gas flow is kept lower when the abnormal condition occurs in this embodiment. Thus, the amount of the heat transferred to the catalytic converter per unit time is kept low when the abnormal condition occurs and, thereby, an excessive temperature rise in the catalytic converter is also suppressed in this embodiment.

In the embodiment in FIG. 8, the subthrottle valve is used for adjusting the amount of the intake air regardless of the operation of the acceleration pedal by the operator. However, suppression control similar to that in FIG. 8 can be performed by throttle devices other than the subthrottle valve. For example, when the engine is equipped with an electronic control system for the throttle valve, the suppression control can be performed using the throttle valve. In the electronic control system for the throttle valve, an independent actuator for operating the throttle valve is provided, and the position of the throttle valve can be set regardless of the amount of operation of the acceleration pedal. Therefore, when the abnormal condition occurs, a similar control to that in FIG. 8 can be performed by controlling the throttle valve.

Figure 10:
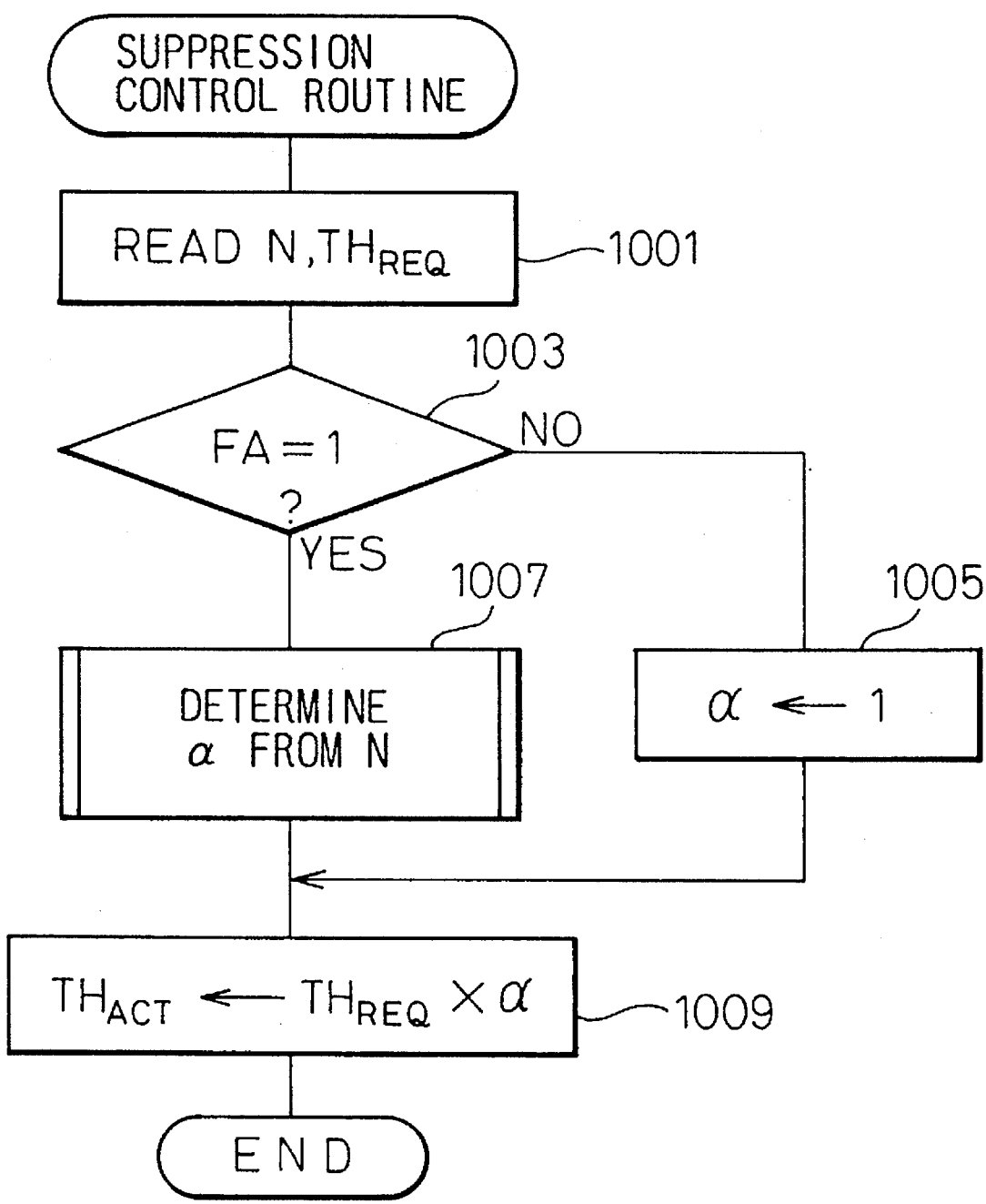
FIG. 10 is a flowchart showing another example of the routine for suppressing an excessive temperature rise in the heater-converter.
Figure 11:
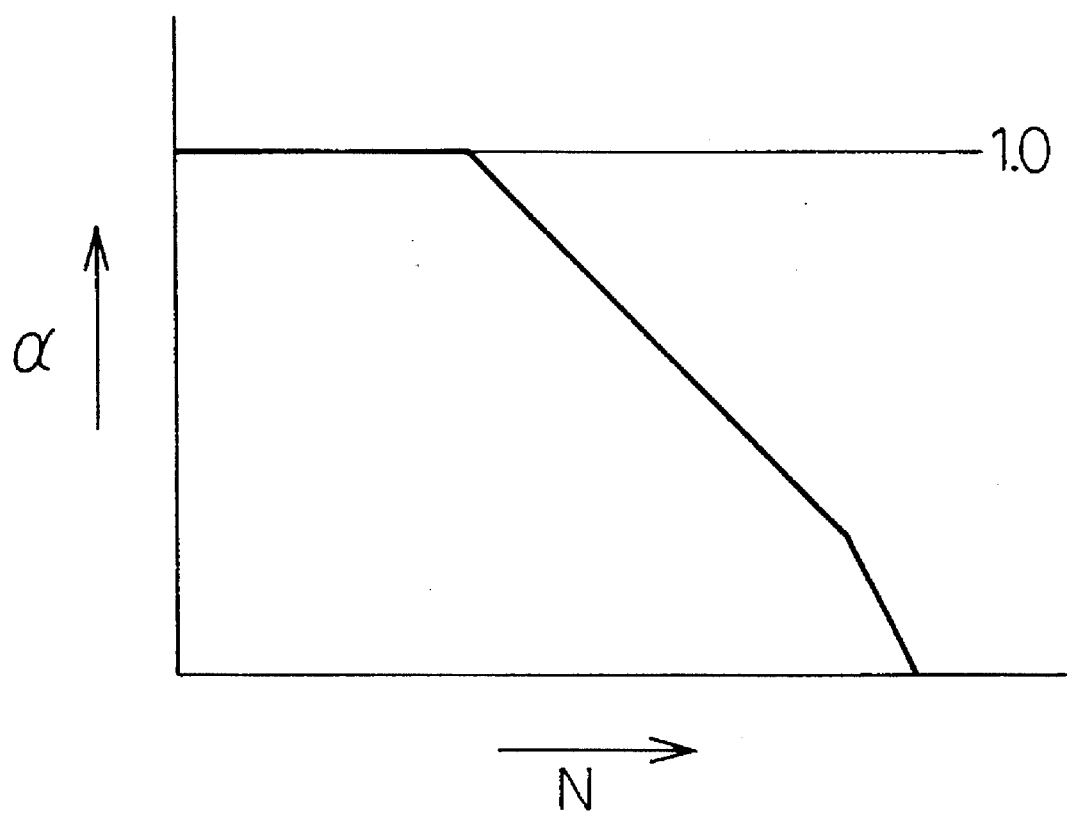
FIG. 11 shows a map used in the routine in FIG. 10.

FIG. 10 shows an example of the flowchart of the suppression control applied to the engine having the electronic control system for the throttle valve. In this embodiment, the ECU 20 receives a signal representing the degree of opening of the throttle valve required by the operator $TH_{REQ}$ (step 1001 in FIG. 10). The signal $TH_{REQ}$ is generated by a position sensor which detects the position of the acceleration pedal. The ECU 20 controls the actuator of the throttle valve so that the actual degree of opening of the throttle valve becomes a value $TH_{ACT}$ which is given by $TH_{ACT=THREQ\times\alpha}$ (step 1009). When the abnormal condition does not occur (FA≠1 at step 1003), the value of the coefficient α is set at 1.0, thus the degree of opening of the throttle valve $TH_{ACT}$ becomes the same as the value of $TH_{REQ}$. Therefore, the degree of opening of the throttle valve is set at the value required by the operator. However, when the abnormal condition occurs (i.e., FA=1 at step 1003), the value of α is determined by step 1007 within the range of 0<α≦1 in accordance with the engine speed N. FIG. 11 shows an example of the map used for determining the value of α at step 1007. From FIG. 11, it will be understood that the position of the throttle valve is controlled in the same manner as in FIG. 9.

Next, an embodiment of the suppression control which is applied to an engine equipped with an automatic transmission is explained. In this embodiment, the setting of the gear shift characteristics are changed when the abnormal condition occurs. Namely, when the value of the abnormal flag FA is set to 1 by the routine in FIG. 5, the ECU 20 controls the automatic transmission based on a gear shift characteristics different from those in the normal condition to thereby maintain the engine speed at lower range than in the normal condition. By this control, the amount of the exhaust gas is reduced.

Figure 12A:
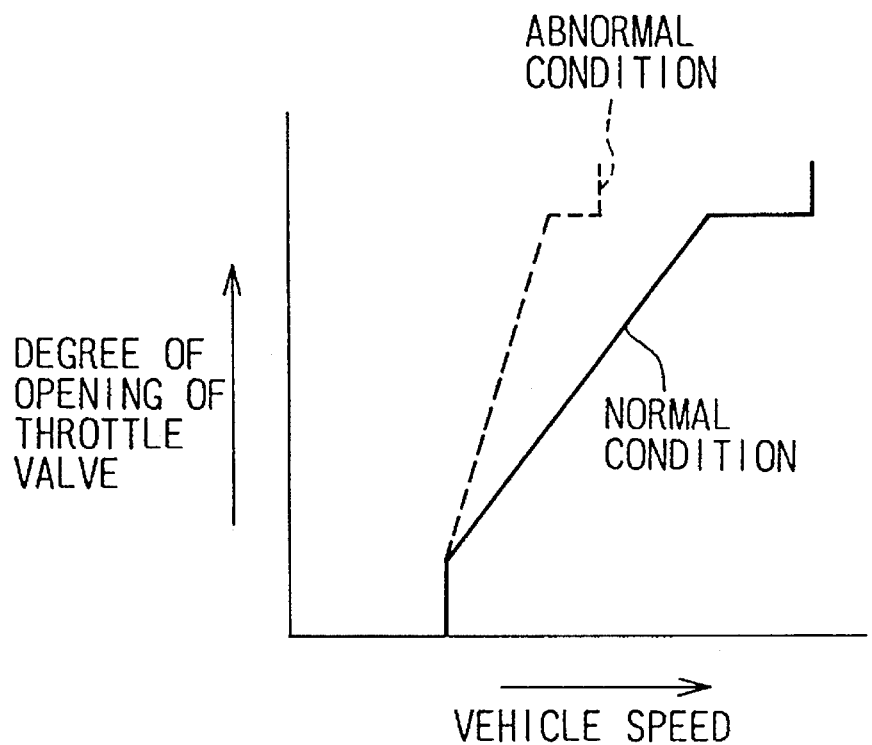
FIGS. 12A and 12B are diagrams explaining another embodiment of the present invention.

FIG. 12A shows an example of the shift characteristics of the automatic transmission used in the normal condition (shown by the solid line) and in the abnormal condition (shown by the dotted line), respectively. The curves in FIG. 12A show the shift characteristics for shift up from the 1st gear to the 2nd gear. As seen from FIG. 12A, the shift up from the 1st gear to the 2nd gear in the abnormal condition is performed at lower vehicle speeds than in the normal condition if the degree of opening of the throttle valve is the same. Though not shown in FIG. 12A, the shift down from the 2nd gear to the 1st gear is also carried out at lower speed in the abnormal condition. Also the gear shift characteristics in other gears are set in the abnormal condition in such a manner that both the shift up and shift down between the gear stages are carried out at lower vehicle speeds than in the normal condition if the degree of opening of the throttle valve is the same. Therefore, when the abnormal condition occurs, the engine is operated in a lower speed range than in the normal condition. Thus, the amount of the heat transferred from the exhaust gas to the catalytic converter is reduced in the abnormal condition.

Figure 12B:
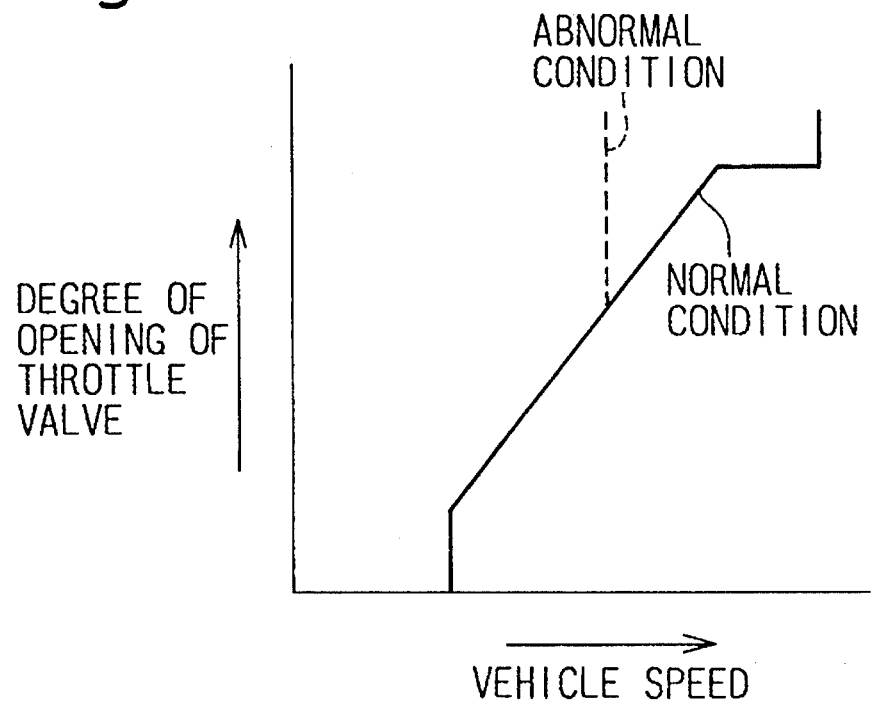

In the embodiment in FIG. 12A, the gear shift characteristics are changed in the entire vehicle speed range. However, the exhaust gas temperature is generally low when the engine speed (i.e., vehicle speed) is low. Therefore, the gear shift characteristics in the abnormal condition need to be changed only in the high vehicle speed range as shown in FIG. 12B.

As explained above, the amount of the exhaust gas flow is reduced to suppress an excessive temperature rise in the catalytic converter when the abnormal condition occurs. However, an excessive temperature rise also can be suppressed by lowering the exhaust gas temperature or reducing the amount of the heat generated by the catalytic converter. In the following embodiments, an excessive temperature rise in the catalytic converter in the abnormal condition is suppressed by changing the mode of the over temperature protection control.

The over temperature protection control (hereinafter called OTP control) is carried out to protect the elements in the exhaust gas system, especially the catalytic converter, against high exhaust gas temperature during high load operation of the engine. In OTP control, when the engine is operated at high load in which the exhaust gas temperature is expected to exceed a predetermined value (for example, 850° C.), the ECU 20 increases the amount of the fuel supplied to the engine by a predetermined amount. By increasing the fuel amount, the air-fuel ratio of the combustion of the engine becomes lower than the stoichiometric air-fuel ratio and thereby the combustion temperature becomes lower due to the excessive fuel and the shortage of oxygen. Therefore, when OTP control is carried out, a temperature rise of the exhaust gas is suppressed.

In the following embodiment, an excessive temperature rise in the catalytic converter in the abnormal condition is suppressed by extending the engine operating region in which OTP control is carried out.

Figure 13:
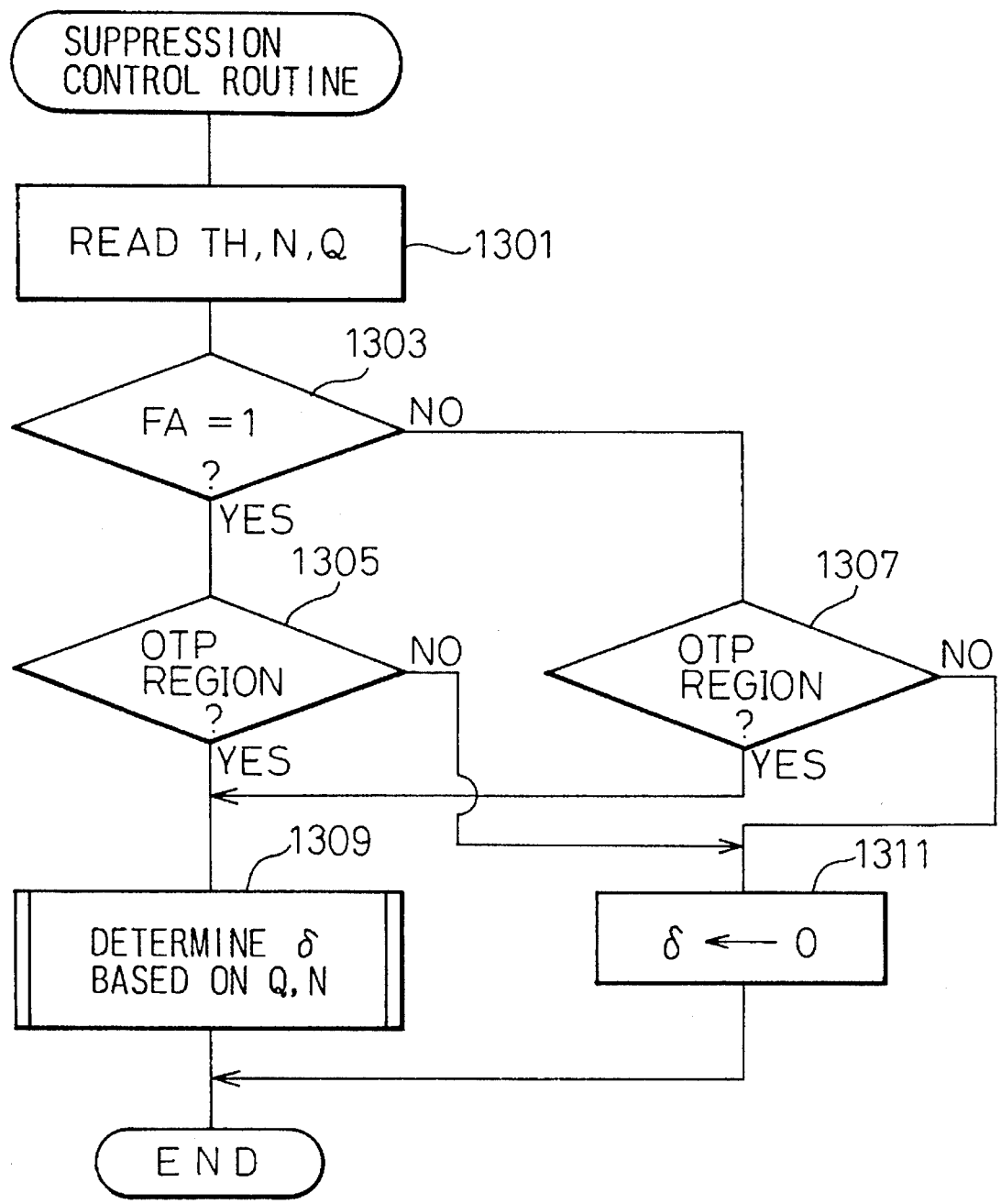
FIG. 13 is a flowchart showing another example of the routine for suppressing an excessive temperature rise in the heater-converter.

FIG. 13 shows an example of the flowchart of the suppression control in which the ECU 20 suppress an excessive temperature in the abnormal condition by carrying out OTP control in the engine operating region in which OTP control is not carried out in the normal condition. The routine in FIG. 13 is performed by the ECU 20 at predetermined intervals.

Figure 14:
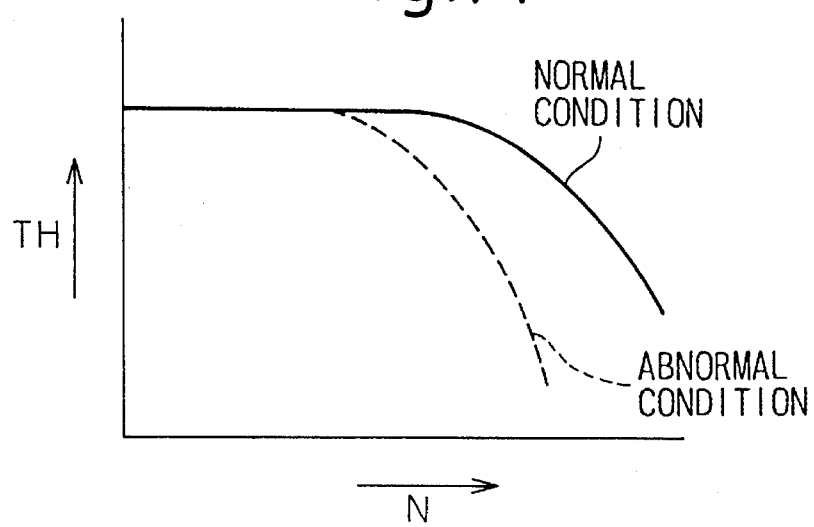
FIG. 14 shows a map used in the routine in FIG. 13.

When the routine starts in FIG. 13, at step 1301, the degree of opening TH of the throttle valve 51 and the engine speed N are read from the sensors 52 and 12, respectively. Further, at step 1301, the amount of the intake air Q is read from the airflow meter 15. At step 1303, it is determined whether a failure of the electrically heated catalytic converter system, in which the termination of the supply of the electric current becomes impossible, has occurred, from the value of the abnormal condition flag FA. If FA≠1 at step 1303, i.e., if a failure of the electrically heated catalytic converter system has not occurred, the routine proceeds to step 1307 which determines whether the engine is operated in the condition requiring OTP control based on the degree of opening TH of the throttle valve and the engine speed N. FIG. 14 shows a map used for the determination of the operating region for OTP control at step 1307. In this embodiment, OTP control is carried out when the TH and N read fall in the region above the solid line in FIG. 14 in the normal condition.

On the other hand, if FA=1 at step 1303 (i.e., if abnormal condition occurs), then at step 1305, it is determined whether OTP control is required. At step 1305, the determination is carried out based on the dotted line in FIG. 14. As seen from FIG. 14, OTP control region defined by the dotted line (in the abnormal condition) is wider than OTP control region defined by the solid line (in the normal condition). Therefore, in the abnormal condition, OTP control is carried out more frequently than in the normal condition, and thereby the exhaust gas temperature is kept lower, as a whole, than in the normal condition.

At step 1305 (abnormal condition) and step 1307 (normal condition), if it is determined that OTP control is required, a fuel increment factor δ (δ>0) is set in accordance with the engine load conditions (for example, the amount of intake air per one revolution of the engine Q/N). If it is determined that OTP control is not required at steps 1305 or 1307, the value of the fuel increment factor δ is set at 0.

Figure 15:
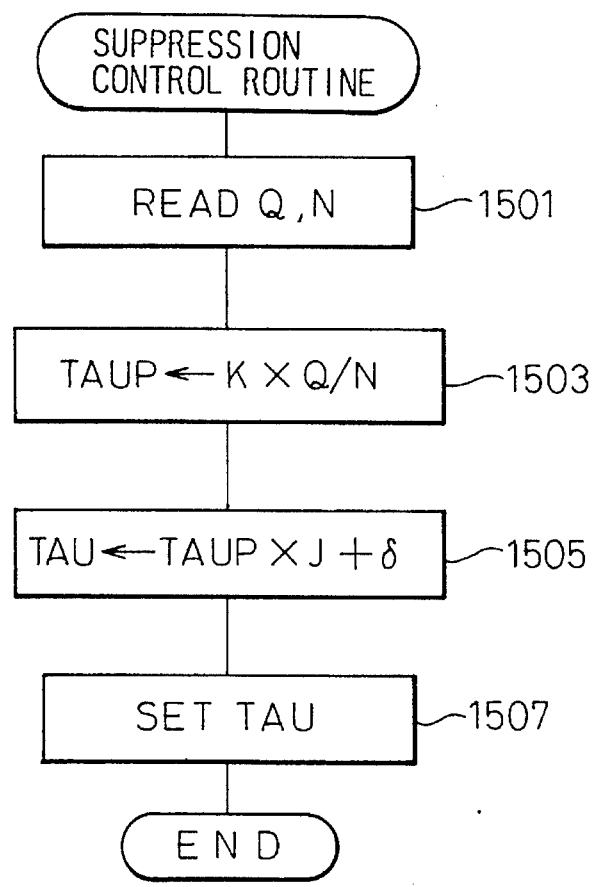
FIG. 15 shows a routine for calculating the fuel injection amount of the engine.

FIG. 15 shows a flowchart of a routine for calculating the fuel injection amount. This routine is performed by the ECU 20 at a predetermined rotation angle of the crankshaft of the engine (for example, every 360° rotation angle).

In FIG. 15, at step 1501, the amount of intake air flow Q and the engine speed N are read from the airflow meter 15 and the engine speed sensor 12, respectively. At step 1503, a basic injection amount TAUP is calculated from Q and N as TAUP=K×Q/N. TAUP is the amount of the fuel required to obtain stoichiometric air-fuel ratio combustion, and K is a predetermined constant. Then, the actual fuel injection amount TAU is calculated at step 1505 as TAU=TAUP×J +δ . J is a constant determined by the engine operating conditions and δ is a fuel increment factor set by the routine in FIG. 13.

As explained before, when OTP control is carried out, the fuel increment factor δ is set larger than 0. Therefore, the amount of the fuel injection during OTP control becomes larger than the usual fuel injection amount. Thus, the air-fuel ratio of the combustion of the engine becomes lower than the stoichiometric air-fuel ratio and combustion temperature becomes low. This causes the exhaust gas temperature to become lower and reduces the amount of the heat transferred to the catalytic converter from the exhaust gas. Further, when the air-fuel ratio of the combustion of the engine becomes lower than the stoichiometric air-fuel ratio (i.e., air-fuel ratio becomes rich), the concentration of the oxygen component in the exhaust gas becomes very low. This causes the oxidation reactions of the HC and CO components in the catalytic converter to be lowered, thus the amount of the heat generated by the reaction in the catalytic converter also becomes smaller. Therefore, by carrying out OTP control in the abnormal condition, both the heat amount transferred from the exhaust gas to the catalytic converter and the heat amount generated by the catalytic reaction can be reduced, thereby an excessive temperature rise of the catalytic converter in the abnormal condition can be suppressed.

Figure 16:
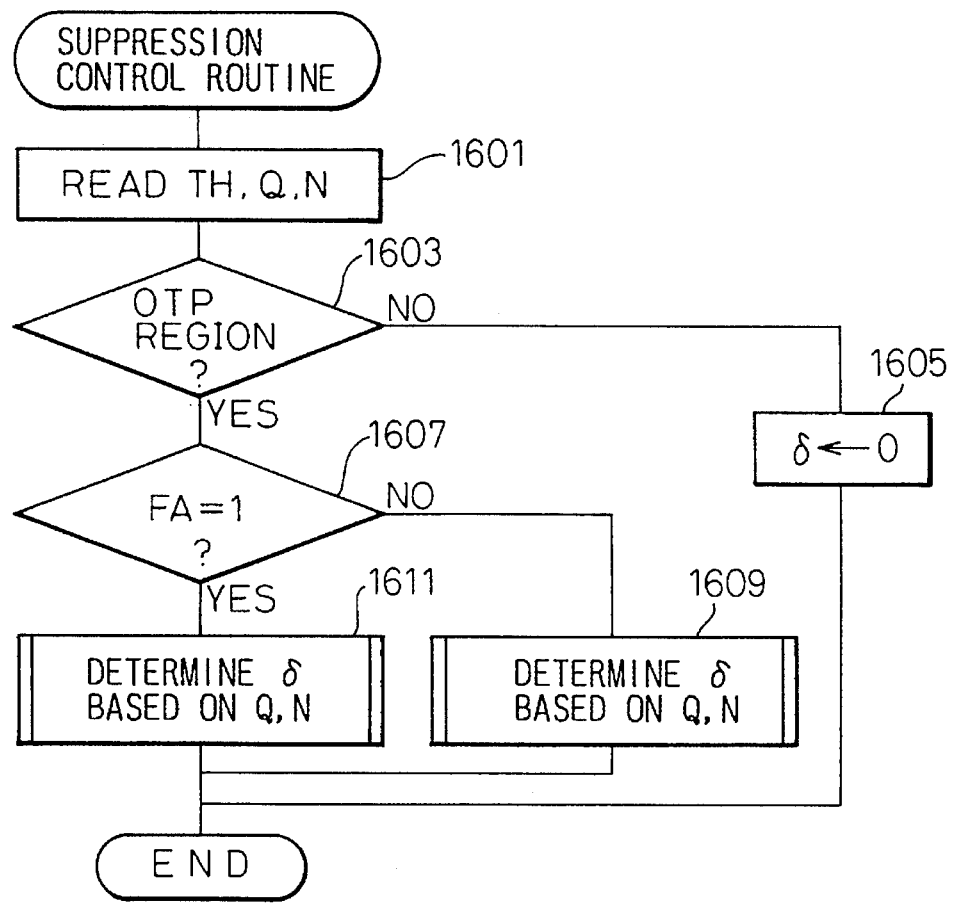
FIG. 16 is a flowchart showing another example of the routine for suppressing an excessive temperature rise in the heater-converter.

FIG. 16 shows a flowchart of another embodiment of the suppression control utilizing OTP control. In the embodiment in FIG. 13, the engine operating region in which OTP control is carried out is extended in the abnormal condition. In this embodiment, however, the fuel increment factor δ, instead of the operating region for OTP control, is increased in the abnormal condition.

Figure 17:
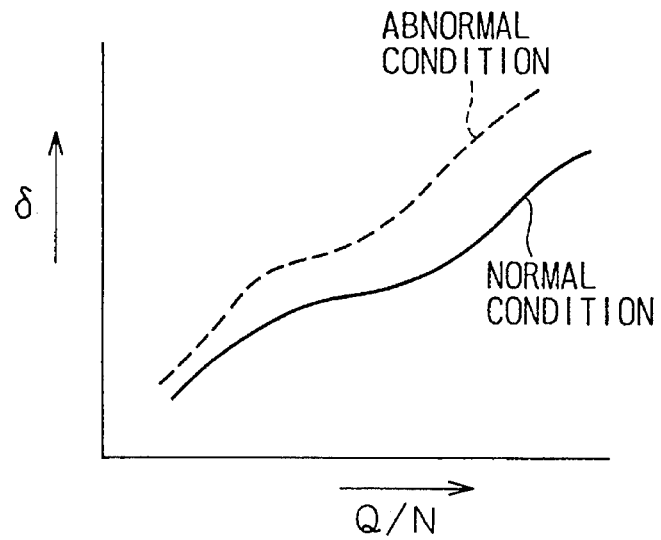
FIG. 17 shows a map used in the routine in FIG. 16.

In FIG. 16, when the routine starts, the degree of opening TH of the throttle valve 51, the engine speed N, and the amount of the intake air Q are read from the sensors 52, 12 and 15, respectively, at step 1601. Then, at step 1603, it is determined whether OTP control is required. At this time, the determination is carried out on the basis of the solid line in FIG. 14. If OTP control is not required, the value of the fuel increment factor δ is set at 0 at step 1605, and the routine is terminated. If it is determined that OTP control is required at step 1603, the routine proceeds to step 1607 which determines whether the value of the abnormal flag FA (FIG. 5) is 1. Then, at steps 1609 or 1611, the value of the δ is determined in accordance with the result of the determination at step 1607. In this embodiment, the value of the fuel increment factor δ is given by functions of the engine load (for example, the amount of the intake air per one revolution of the engine, i.e., Q/N), and is determined in accordance with the map shown in FIG. 17. The value of the δ is determined in accordance with the solid line in FIG. 17 in the normal condition (i.e., FA=0 at step 1607), and in accordance with the dotted line in FIG. 17 in the abnormal condition (i.e., FA=1 at step 607). As seen from FIG. 17, the value of the fuel increment factor δ is set larger in the abnormal condition than the same in the normal condition. Therefore, when a failure of the electrically heated catalytic converter system occurs, the decrease of the exhaust gas temperature becomes larger than in the normal condition when the engine is operated in the region in which the exhaust gas temperature is expected to increase, and also the amount of the heat generated by the catalytic reaction becomes smaller. Thus, an excessive temperature rise of the catalytic converter is suppressed in the abnormal condition.

In the above embodiments, one of the operating region for OTP control (FIG. 13), or the fuel increment factor δ (FIG. 16) is changed in the abnormal condition, but both the operating region for OTP control and the fuel increment factor δ may be changed in the abnormal condition. In this case, OTP control is performed in wider operating region, and the amount of the fuel increment in OTP operation is increased in the abnormal condition at the same time, therefore an excessive temperature rise of the catalytic converter can be suppressed more effectively.

Figure 18:
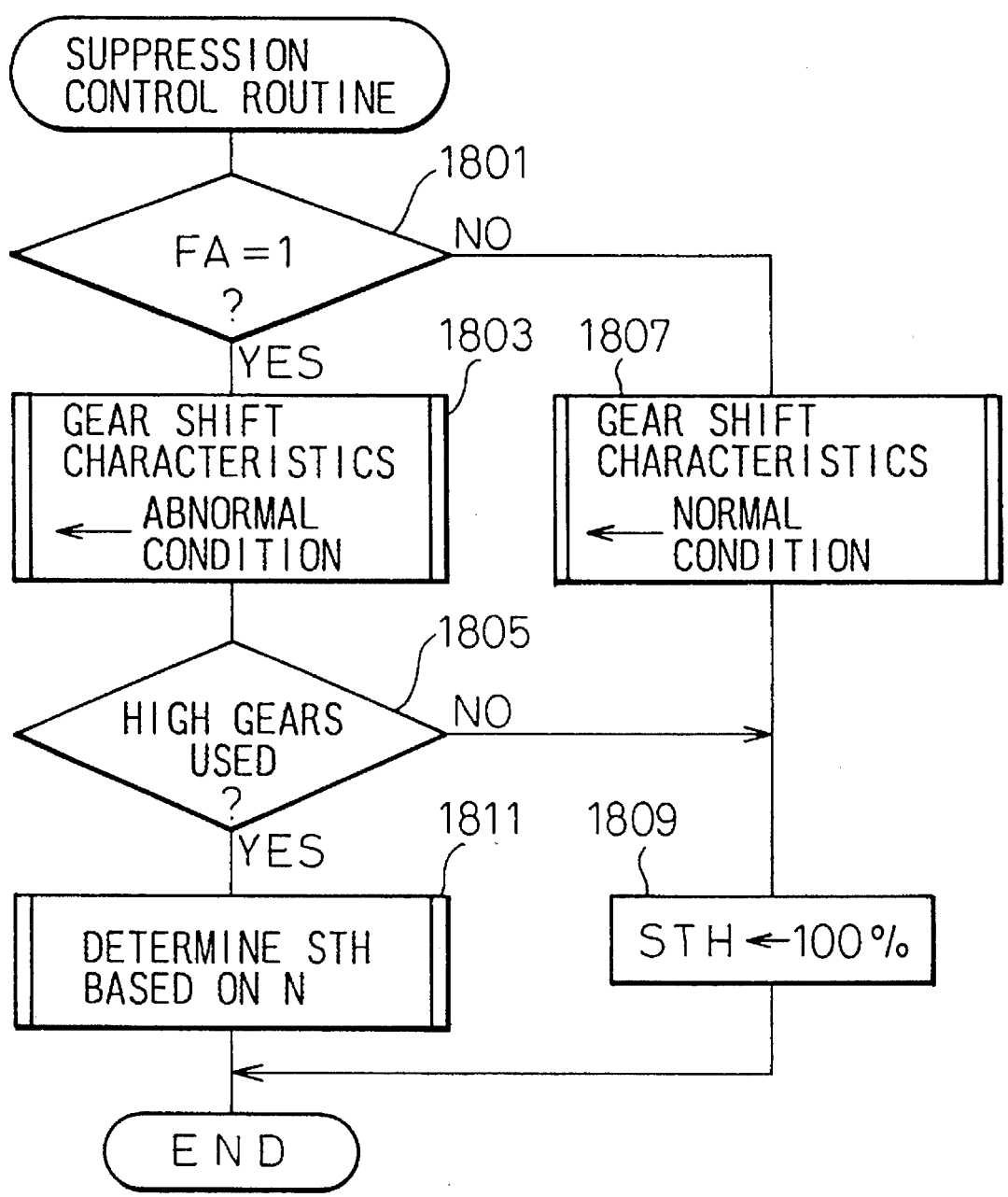
FIG. 18 is a flowchart showing another example of the routine for suppressing an excessive temperature rise in the heater-converter.

Though several embodiments of the suppression control of the present invention are explained above, one or more of the above embodiments can be used in combination to suppress an excessive temperature rise of the catalytic converter. For example, FIG. 18 shows an embodiment which is a combination of the embodiments of FIG. 8 and FIG. 12. In this embodiment, gear shift characteristics are changed as explained in FIGS. 12A and B when the abnormal condition occurs (FIG. 18, steps 1801 and 1803). Further, the reduction of the amount of the intake air as explained in FIGS. 8 and 9 is carried out by the subthrottle valve control when the vehicle is using higher gears (for example, 3rd gear, or overdrive) in the abnormal condition (FIG. 18, step 1805 and 1809). Namely, the reduction of the intake air is carried out only when the vehicle is using the higher gears even in the abnormal condition. Since the reduction of the intake air causes a decrease in the engine output, suppression control by changing the gear shift characteristics is carried out first, and suppression control by controlling the subthrottle valve is carried out only when a further gear shift is not available (i.e., when the vehicle is using higher gears).

In FIG. 18, OTP control explained in FIGS. 13 through 17 may be carried out when the vehicle is using higher gears instead off the subthrottle control (step 1811 and 1809).

Though the present invention has been described with reference to specific embodiments chosen for the purpose of illustration, it should be understood that numerous modification could be applied by those skilled in the art without departing from the basic concept and scope of the present invention.

I claim:

1. An electrically heated catalytic converter system for an engine having an exhaust passage, comprising:
   a) a catalytic converter disposed on the exhaust passage of the engine for removing pollutants in the exhaust gas;
   b) an electric heater for heating said catalytic converter;
   c) an electricity supply being connected to the electric heater;
   d) an electronic control unit, receiving and detecting engine operating conditions, and performing the functions of:
      (i) controlling the electricity supply to supply electricity to the electric heater for a predetermined time period after the engine starts, to thereby increase the temperature of the catalytic converter;
      (ii) detecting that a failure has occurred in controlling the electricity supply such that the electricity supply continues to supply electricity to the electric heater after said predetermined time period has lapsed; and (iii) suppressing an excessive temperature rise of the catalytic converter when detecting a failure in controlling the electricity supply.

2. The electrically heated catalytic converter system according to claim 1, wherein said electronic control unit further performs the function of:

(iv) adjusting the amount of the exhaust gas flowing through the catalytic converter, and said function of (iii) suppressing further comprises suppressing an excessive temperature rise in the catalytic converter by reducing the amount of exhaust gas flowing through the catalytic converter upon detecting a failure in controlling the electricity supply.

3. The electrically heated catalytic converter for an engine according to clam 1, wherein said electronic control unit further performs the function of:

(iv) suppressing the temperature rise of the exhaust gas by increasing the fuel supplied to the engine by a predetermined mount when the engine is operated in a predetermined operating region in which an excessive temperature rise of the exhaust gas is expected, and said function of (iii) suppressing further comprises suppressing the excessive temperature rise in the catalytic converter by performing said function (iv) of suppressing the temperature rise in the exhaust gas in an engine operating region wider than said predetermined operating region, upon detecting a failure in controlling the electricity supply.

4. An electrically heated catalytic converter for an engine according to claim 1, wherein said electronic control unit further performs the function of:

(iv) suppressing the temperature rise of the exhaust gas by increasing the fuel supplied to the engine by a predetermined mount when the engine is operated in a predetermined operating region in which an excessive temperature rise of the exhaust gas is expected, and said function of (iii) suppressing further comprises suppressing an excessive temperature rise in the catalytic converter when detecting a failure in controlling the electricity supply by controlling the function of (iv) suppressing in such a manner that said function of (iv) suppressing increases the fuel supplied to the engine by an amount larger than said predetermined amount when the engine is operated in said predetermined operating region.

5. A method for controlling an electrically heated catalytic converter system for an engine having an exhaust passage, comprising the steps of:

a) controlling an electricity supply to supply electricity to an electric heater for a predetermined time period after the engine starts, to thereby increase the temperature of the catalytic converter;

b) detecting that a failure has occurred in controlling the electricity supply such that the electricity supply continues to supply electricity to the electric heater after said predetermined time period has lapsed; and c) suppressing an excessive temperature rise of the catalytic converter when detecting a failure in controlling the electricity supply.

6. The method according to claim 5 further comprising the step of:

d) adjusting the amount of the exhaust gas flowing through the catalytic converter, wherein said step of c) suppressing further comprises suppressing an excessive temperature rise in the catalytic converter by reducing the amount of exhaust gas flowing through the catalytic converter upon detecting a failure in controlling the electricity supply.

7. The method according to claim 5, further comprising the step of:

e) suppressing a temperature rise of the exhaust gas by increasing the fuel supplied to the engine by a predetermined amount when the engine is operated in a predetermined operating region in which an excessive temperature rise of the exhaust gas is expected, wherein said step of c) suppressing further comprises suppressing the excessive temperature rise in the catalytic converter by performing said step of d) suppressing the temperature rise in the exhaust gas in an engine operating region wider than said predetermined operating region, upon detecting a failure in controlling the electricity supply.

8. The method according to claim 5, further comprising the step of:

d) suppressing a temperature rise of the exhaust gas by increasing the fuel supplied to the engine by a predetermined mount when the engine is operated in a predetermined operating region in which an excessive temperature rise of the exhaust gas is expected, wherein said step of c) suppressing further comprises suppressing an excessive temperature rise in the catalytic converter when detecting a failure in controlling the electricity supply by controlling the step of d) suppressing in such a manner that said step of d) suppressing increases the fuel supplied to the engine by an amount larger than said predetermined amount when the engine is operated in said predetermined operating region.

* * * * *

UNITED STATES PATENT AND TRADEMARK OFFICE
CERTIFICATE OF CORRECTION

PATENT NO. : 5,553,451
DATED : September 10, 1996
INVENTOR(S): Kenichi HARADA

It is certified that error appears in the above-indentified patent and that said Letters Patent is hereby corrected as shown below:

ABSTRACT, line 8, change "lapsed" to --lapses--.

ABSTRACT, line 15, change "lapsed" to --lapses--.

Column 1, line 40, change "lapsed" to --lapses--.

Column 2, line 10, delete "the" before "damage" and change "of" to --to--.

Column 4, line 4, insert --a-- before "common".

Column 4, line 12, change "temperatures" to --temperature--.

Column 5, line 21, change "started" to --starts--.

Column 5, line 25, change "is" to --are--.

Column 5, line 66, delete "the" before "electricity".

Column 6, line 9, change "damage of" to --damage to--.

Column 7, line 3, insert --a-- before --sufficiently--.

Column 7, line 32, change "K." to --$K_1$.--.

Column 7, line 35, change "$N_{MAX \geq N}$" to --$N_{MAX} \geq N$--.

UNITED STATES PATENT AND TRADEMARK OFFICE
CERTIFICATE OF CORRECTION

PATENT NO. : 5,553,451
DATED : September 10, 1996
INVENTOR(S) : Kenichi HARADA

It is certified that error appears in the above-indentified patent and that said Letters Patent is hereby corrected as shown below:

Column 7, line 36, change "$N_{MAX} \angle N$" to --$N_{MAX} < N$--.

Column 9, line 7, change "$TH_{ACT-THREQ_{xa}}$" to --$TH_{ACT} = TH_{REQ} x a$--."

Column 9, line 26, delete "a".

Column 9, line 36, don't bold "1" of "1st".

Column 10, line 45, change "read" to --readings--.

Column 11, line 10, insert a period at end of line.

Column 11, line 11, delete the period before "J".

Column 12, line 55, delete "being".

Column 13, line 19, change "mount" to --amount--.

Column 13, line 34, change "mount" to --amount--.

Signed and Sealed this

First Day of July, 1997

BRUCE LEHMAN

Attest:

Attesting Officer

Commissioner of Patents and Trademarks